US009189735B2

(12) United States Patent
Ni et al.

(10) Patent No.: US 9,189,735 B2
(45) Date of Patent: Nov. 17, 2015

(54) SPARSE CLASS REPRESENTATION WITH LINEAR PROGRAMMING

(71) Applicant: Massachusetts Institute of Technology, Cambridge, MA (US)

(72) Inventors: Karl Ni, Palo Alto, CA (US); Katherine L. Bouman, W. Lafayette, IN (US); Nadya T. Bliss, Scottsdale, AZ (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 286 days.

(21) Appl. No.: 13/716,940

(22) Filed: Dec. 17, 2012

(65) Prior Publication Data

US 2014/0172764 A1    Jun. 19, 2014

(51) Int. Cl.
*G06N 5/02* (2006.01)
(52) U.S. Cl.
CPC ........................................ *G06N 5/02* (2013.01)
(58) Field of Classification Search
None
See application file for complete search history.

(56) References Cited

PUBLICATIONS

Stéphane Girard et al., Modelling and Inference of Complex and Structured Stochastic Systems, 2006, INRIA (French Institute for Research in Computer Science and Automation), http://raweb.inria.fr/rapportsactivite/RA2006/mistis/mistis.pdf.*

Manuel Lameiras Campagnolo et al., Contextual classification of remotely sensed images with integer linear programming (Extended Abstract), 2007, http://www.isa.utl.pt/matapl/abstracts/abstract02_06.pdf.*

Yixin Chen , MILES: Multiple-Instance Learning via Embedded Instance Selection , Oct. 30, 2006 , Pattern Analysis and Machine Intelligence, IEEE Transactions on (vol. 28 , Issue: 12), http://ieeexplore.ieee.org/stamp/stamp.jsp?tp=&arnumber=1717454&tag=1.*

* cited by examiner

*Primary Examiner* — Kakali Chaki
*Assistant Examiner* — Viker Lamardo
(74) *Attorney, Agent, or Firm* — Anderson Gorecki & Rouille LLP

(57) ABSTRACT

A method, apparatus and computer program product for providing sparse class representation with linear programming is provided. A first model is built using a positive data set. A second model is built using a negative data set. Linear programming is used to distinguishing the first model from the second model to determine a set of salient features for a filter for use as an image classifier.

20 Claims, 7 Drawing Sheets

SPARSE CLASS REPRESENTATION WITH LINEAR PROGRAMMING

BACKGROUND

Image classification is a classical computer vision problem with applications to semantic image annotation, querying, and indexing. There are numerous applications that require classifiers to recognize image content, the most prominent being labeling and retrieving images semantically. Traditional training and classification procedures, for the most part, rely on two components: feature extraction and matching. Focus on either component has merited large efforts. To ensure relevant and accurate features, research has been conducted into improving the training data fidelity and segmentation truth in Torralba's LABELME®, the now-retired GOOGLE® labels, and most face/object detection/recognition training sets. Meanwhile, traditional approaches in matching/classification assume the supervised "one-versus-all" semantic labeling framework, which includes individual object detectors.

Linear programming is a mathematical method for determining a way to achieve a best outcome (such as maximum profit or lowest cost) in a given mathematical model for some list of requirements represented as linear relationships. Linear programming is a specific case of mathematical programming (mathematical optimization). More formally, linear programming is a technique for the optimization of a linear objective function, subject to linear equality and linear inequality constraints.

Linear programming can be applied to various fields of study. It is used in business and economics, but can also be utilized for engineering problems. Industries that use linear programming models include transportation, energy, telecommunications, and manufacturing. It has proved useful in modeling diverse types of problems in planning, routing, scheduling, assignment, and design.

SUMMARY

Computer vision as well as statistical and machine learning algorithms depend on a training set to use as reference when inferring relationships between extracted features in a query. Therefore, to compare a query (image) to a reference training set, learning algorithms almost universally attempt to solve two problems. The first problem is the extraction of useful and salient features. The second problem is the matching of features to make inferences and decision.

In organizing extracted features for ease of matching, recent techniques for image classification approach the problem generatively, assume Gaussianity, rely on distance metrics, and estimate distributions, but are unfortunately not convex nor scalable. Other conventional mechanisms suffer from a variety of deficiencies. The present invention approaches the problem with convex linear programming using similarity metrics rather than commonly-used Mahalanobis distances. It does not rely on distributions and does not suffer from the difficulties conventional approaches may face. Specifically, the problem is solved through a hybrid iterative method that takes advantage of optimization space properties. The optimization problem exclusively uses dot products in the feature space, and therefore can be extended to non-linear kernel functions in the transductive setting. That is to say, we can use any similarity function (no matter how nonlinear) so long as it is symmetric and positive definite. When attempting to classify a query, we simply use a nearest matched filter correlation.

Both feature extraction and matching require low noise levels in the training data, and therefore, significant manual involvement in either labeling or segmentation. Moreover, extensive cross-validation procedures are required to drive down false alarms. Finally, there may be multiple instances of a single concept. This has inspired a push towards multi-instance, unsupervised learning in which the proposed methodology is grouped. The paradigm reflects the law of large numbers, where with enough quantity, where current data rates and accessibility are outpacing processing capabilities, training quality can be improved naturally through noise integration.

Algorithms must therefore address two problems with unsupervised approaches. First, researchers must have large and expansive training to capture all instances of a concept in any situation or environment. Second, with large training sets, systems must exhibit efficiency and scalability, and they must do so autonomously. Unsupervised systems often turn to one of the most mature and successful techniques with parameter estimates of multi-modal Gaussian Mixture Models (GMM's). Under correct choices in the number of clusters, assumptions on noise behavior, and good initialization, GMMs are efficient and informative. Unfortunately, without these conditions, maximum likelihood parameter estimates through expectation maximization (EM, a.k.a, iterative annealing) will produce irrecoverable and incorrect feature prototypes. Furthermore, GMMs have small sample bias and are often instable with respect to parameterization. Subsequently, iteratively determined optimal values are sensitive to initialization. Online or incremental clustering is also limited through EM and may require respecification of variables. The problem is augmented by the number of parameters to be updated, which significantly impacts the objective function. Finally, convergence speed depends on dimensionality as GMMs and similar techniques traditionally (and logically) utilize difference metrics, often the Mahalanobis distance.

Instead of modeling the representation generatively, prototype features for comparing images are determined directly by finding a small subset through sparsity constraints in a linear programming (LP) problem. The resultant system classifier relies on normalized cross-correlation (similarity) between features derived from a query image and the trained subset of prototypes, and performs well. The methodology fits well with common semantic classification frameworks in image processing problems.

Embodiments of the invention significantly overcome such deficiencies and provide mechanisms and techniques that provide a sparse class representation with linear programming. Linear programming is used to determine set of salient features that make the object stand apart from rest of image data (noise). The process is considered minimally supervised in the sense that a set of images are provided that have the object without specifying where that object is in the image and a set of data is provided that doesn't have the object. Stated differently, the presently described method involves taking in a training set of the object being searched for (positive set) and a training set of things not being searched for (negative set) and from these sets finding a best description (salient features) of the object you are looking for.

For example, if the object being searched for is a loaf of bread, a group of images are provided that each includes a loaf of bread (referred to herein as a positive data set). A second group of images is provided that doesn't include a loaf of bread (referred to herein as a negative data set). A model is built from the positive data set and a model is built from the negative data set. Linear programming problem optimization is used to come up with the difference between models, referred to as a filter. This filter can be applied to a new image to determine if the new image contains a loaf of bread. While the present invention is described with respect to video images, it is not intended to be limited to only video images and is also applicable to data sets regarding audio signals, text, and the like.

In a particular embodiment of a method for providing a sparse class representation with linear programming, the method includes building a first model using a positive data set and building a second model using a negative data set. The method further includes using linear programming to distinguishing the first model from the second model to determine a set of salient features for a filter for use as an image classifier.

Other embodiments include a computer readable medium having computer readable code thereon for providing a sparse class representation with linear programming. The computer readable medium includes instructions for building a first model using a positive data set and building a second model using a negative data set. The computer readable medium further includes instructions for using linear programming to distinguishing the first model from the second model to determine a set of salient features for a filter for use as an image classifier.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides sparse class representation with linear programming as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing sparse class representation with linear programming as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers or on one computer alone.

It is to be understood that the embodiments of the invention can be embodied strictly as a software program, as software and hardware, or as hardware and/or circuitry alone.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1A:
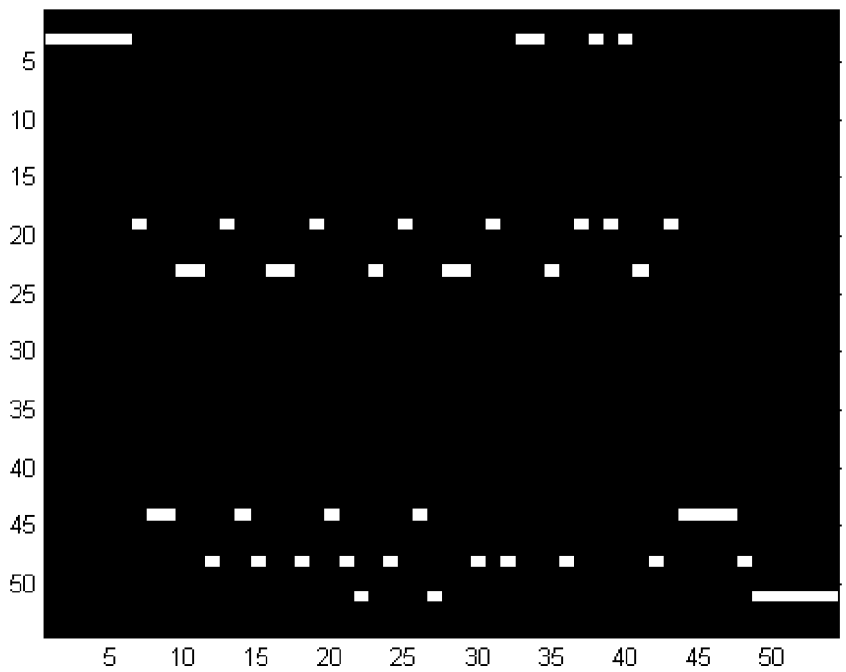
FIG. 1A is a graph showing a $l_1$-norm minimization.
Figure 1B:
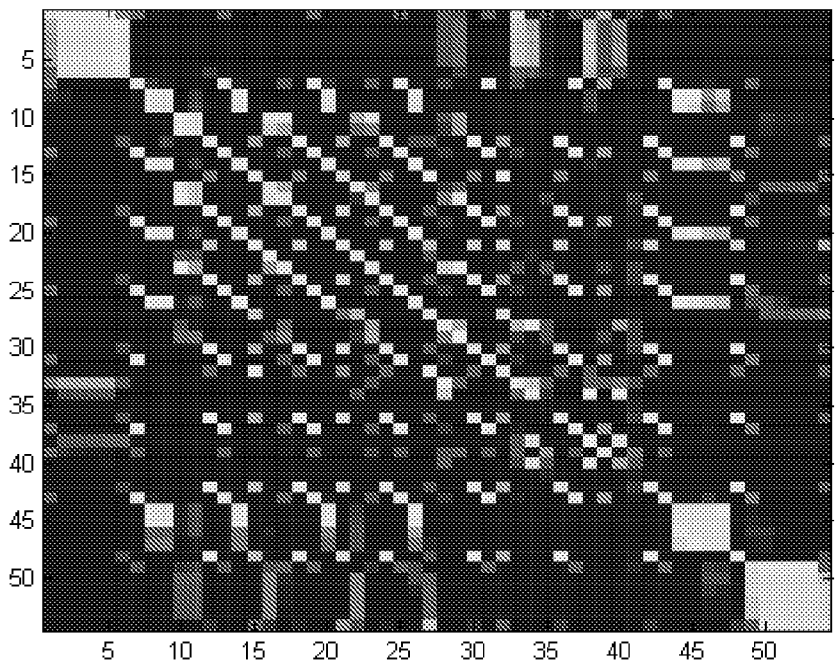
FIG. 1B is a graph showing the $l_1$-norm minimization of a collection of $l_2$-norms on the columns of $\beta$.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

The goal of pattern classification in the traditional statistical and machine learning framework is to characterize classes so that input features can be readily recognized in the presence of noise. Model selection techniques and comparison metrics are important considerations in representing classes with robust, discriminant features. This work assumes correlation-based similarity metrics. With this assumption, an optimization problem is proposed to obtain the sparsest yet most salient set of features as a representation for any class.

Like most learning algorithms, the proposed work requires training. As data rates and accessibility are outpacing processing capabilities, significant efforts must be (and have been) made to develop tools to improve automation. Techniques to reduce supervision include clustering, feature selection, k-means, Markov random walk methods, quality thresholding, and GMMs. Instead of modeling the sparse representation, the idea is to find sparsity directly, and to obtain sparse representations of classes through linear programming (LP) and an LP approximate. Using similarity (i.e., correlation) rather than difference metrics (e.g., Mahalonobis distances in GMMs), matched filters are used to classify, a concept that has been studied extensively in "nearest neighbor" frameworks and reflects a distinctly signal processing approach that under normalization, performs the same as its difference metric counterparts. Hence, the optimal filters that are most representative of a class "basis feature set" yet least redundant while addressing the computational load for large datasets are found. To extend the proposed algorithm into practice, we discuss analogous concepts, such as hierarchical clustering and linear discriminant analysis that are present in generative methods.

For most learning frameworks, an instance x is classified by comparing to prototypes or probabilistic models to determine the likeliest solution based on a distribution in some feature space. That is, the feature vector x belongs to class i of C classes if it is closest to the prototypes in the set $\{y_j\}$; characterizing the $i^{th}$ class. Take a simplistic view of classification in GMMs, where each mixture component relates to a single class:

$$\operatorname*{argmax}_{i \in \{1, \ldots, C\}} K \exp[(x - y_i)^T \Sigma^{-1} (x - y_i)] \quad (1)$$

$$= \operatorname*{argmin}_{i \in \{1, \ldots, C\}} -2x^T \Sigma^{-1} y + \|y_i\|^2_{\Sigma^{-1}}. \quad (2)$$

Solutions to Equation (2) are the same as equation (1); that is, the classification of an input x relies on the Mahalanobis distance to all class prototypes. It is not uncommon to normalize $Y_i^T \tau^{-1} y_i$ to a scalar value (say unity) for every class, though feature vectors are constrained to the unit ellipse (or ball, depending on $\Sigma$). Normalized class representations can be found in many applications in biological datasets, image processing applications, detection-theory, etc., where a signal processing paradigm places significant emphasis on the relationship between feature dimensions rather than the actual values themselves. For example, pre-processing in images for computer vision-based applications often involves DC subtraction and division by pixel variance.

Under such an assumption, equation (2) can be written as the dot product of x and $y_i$:

$$\operatorname*{argmax}_{i \in \{1, \ldots, C\}} <x, y_i> \quad (3)$$

This is an important result because the classifier is broken down to a simple cross-correlation between x and $y_i$ where $y_i \in \{y_1, y_2, \ldots y_C\}$ each vector a known prototype of a given class. The process of matching x with a bank of filters is frequently called categorization by matched filters, where the Cover and Hart inequality holds, $$R^* \leq R \leq R^{*2 - \frac{C}{C-1} R^*},$$

where $R^*$ is the Bayes error rate.

Training a Sparse Classifier

The features $y_i$ are used as templates, and class covariance matrix is relied upon, as is natural when using similarity metrics. The following describes methodologies in analyzing the covariance matrix to produce matched filters for classification, optimal both in representation space and discrimination space.

Within Class Filter Optimization

Let X be the collection of vectors $x_i \in R^d$, from a data source and Y be another matrix collection of $y_i x_i \in R^d$ features, where d is the dimensionality of the feature space. For M and N data points, $X \in R^{d \times M}$ and $Y \in R^{d \times N}$. The representation problem can be framed as determining a best set of vectors in Y to represent X. Because class representations over large quantities of data will likely be deeply redundant in structure, we assume that $X^T Y$ is inherently low-rank (or, at least, has disproportionately distributed singular values.) Therefore, a class could be efficiently represented by building a very small set of correlation filters that still captures the diversity between features.

As a side note, within a single class, ideally, one would draw X and Y from the same data source, i.e. X=Y. (In similar problems, $\|Y^T Y \beta\|_F$ is frequently optimized over $\beta$ in eigen decompositions.) In our case, discussions on complexity and hierarchical clustering will make it clear as to why we generalize to X≠Y.

Every $x_i$ can be clustered into bins defined by a single $y_j$ and it is desirable to have the fewest $y_j \in Y$ to accommodate all $x_i$. A selection matrix $\beta \in \{0,1\}^{N \times M}$ is defined, where each $\beta_i$ column "chooses" a feature in Y. The decision criteria of whether or not $\beta_{ij} = 1$ depends on the correlation between the class vector $y_j$ with the individual feature $x_i$ (i.e., quality of representation) and simultaneously, the cardinality of the subset that collectively represents X (i.e., sparsest basis set). This can be expressed as:

$$\operatorname*{argmax}_{\beta} \; tr(X^T Y \beta) + \lambda \cdot \|\beta 1\|^2_2 \quad (4)$$

$$\text{such that} \quad \beta_{ij} \in \{0, 1\} \quad \text{and} \quad \beta^T 1 = 1$$

Here 1 is a vector of a all 1's, and $\lambda$ is a tuning parameter. The trace maximization over $\beta$ selects the $y_j \in Y$ that maximizes the correlation with X. The $l_2$ norm maximization translates to minimizing rank, and hence, maximizing row-sparsity, under the regularization constraint that $\beta^T 1 = 1$, which enforces a single $y_j$ for every $x_i$. (Intuition behind maximizing an $l_2$ norm of all $l_1$ terms is the converse of the Group LASSO concept, where an $l_1$ norm of a collection of $l_2$ terms is minimized.)

Unfortunately, $l_2$ norm maximization over a convex set is NP-hard even though KKT conditions still apply. Moreover restrictions on $\beta_{ij}$ as a logical variable suggest a 0-1/binary integer programming problem (also NP-hard, specifically $O(M^N)$), which is neither the case nor sensibly implemented.

Rather, compressed sensing techniques study a variety of convex optimization formulations, where a grouping structure can emerge from sparsity inducing penalty functions, $p\lambda(\beta)$. The literature on group organization techniques in this context has grown in the past few years, where popular choices of $p\lambda(\beta)$ include the SCAD function, the sum of hinge losses, group Lasso penalization, and the F $\infty$ norm to name a few. Many of these loss functions will work, but the infinity norm has been shown to be particularly effective in the presence of noise, and is attractive in this linear programming framework over more prohibitively expensive algorithms. Hence, we propose infinity norm minimization in the following form:

$$\underset{\beta}{\text{argmin}} \quad -tr(X^T Y \beta) + \lambda \cdot \sum_i t_i \qquad (5)$$
$$\text{such that} \quad 0 \leq \beta_{ij} \leq t_i \leq 1$$
$$\text{and} \quad \beta^T 1 = 1$$

The objective function's second term and the first constraint in equation (5) contain the infinity norm regularization over the rows of $\beta$, where minimizing the sum of $t_i$ values induces row sparsity. Also included in this constraint is $0 \leq \beta_{ij} \leq 1$, the LP relaxation over the convex polytope (half-hypercube).

Asymptotic Consistency

The infinity norm regularization in the proposed optimization relies on naturally clustered events, where $x_i$ is not unique within $X$, suggesting inconsistent (and initialization-dependent) $\beta$ estimators. For example, take $X(\xi)=Y+\xi$ where $\xi$ is additive noise. If $Y$ contains several instances of the same vector, then $\hat{\beta}$ can represent $X(\xi)$ with any $y_i$ where $\hat{\beta}$ is the estimated solution. Or, it can represent all of them in the unlikely event that $X(\xi)^T Y = \Pi^T$ with $\lambda$ improperly chosen. This scenario is rare for sufficiently large $\lambda$, since the $l_1$-norm of $l_\infty$-norms tends toward a single selector value as opposed to the 2-norm.

However, there are sufficient conditions for asymptotic consistency, which may not necessarily satisfy $\|\hat{\beta}-\beta\|_2=o_p(1)$, but may guarantee properties about the grouping of features for a given $\lambda$ and the total number of clusters $C(\lambda)$. Under our penalization in equation (5), $\beta$ promotes a unique and consistent grouping, namely that rank $(\beta_g)=1$, with $\beta_g$ being a submatrix of $\beta$ for group g. Therefore, the number of clusters $C(\lambda)$ equals rank $(\beta)$.

This is further evident when it is observed that the eigenvalue distribution since the $i^{th}$ eigenvalue is in $\{0,1\}$ for all $i \in [0_1 \min(M, N)]$ (a byproduct of the constraint $\beta^T 1=1$). Because eigenvectors relate directly to some column in $\beta$, the rank will be precisely the number of classes. Thus trace$(\beta)=C(\lambda)$.

The proof of consistent grouping extends analysis in equation (5) on equation (3) assuming noise $\xi$ in $X(\xi)^T Y \hat{\beta}$. The strategy first assumes $\beta^*_j$ satisfies the KKT conditions. Then, if $f_j$ and $f_{j+k}$ are features in group g, $\beta_{j+k}$ is a solution if and only if $\beta^*=\beta_{j+k}$. This, of course, satisfies the three optimal cases:

$$\left\{\begin{array}{l} B_{ij} = B_{ij+k} \to 1 \\ B_{(i+k)j} = B_{(i+k)(j+k)} \to 0 \end{array}\right\} \Leftrightarrow \text{feature } x_i \text{ is selected} \qquad 1.)$$

$$\left\{\begin{array}{l} B_{ij} = B_{ij+k} \to 1 \\ B_{(i+k)j} = B_{(i+k)(j+k)} \to 0 \end{array}\right\} \Leftrightarrow \text{feature } x_{i+k} \text{ is selected} \qquad 2.)$$

$$\left\{\begin{array}{l} B_{ij} = B_{ij+k} \to \dfrac{1}{g} \\ B_{(i+k)j} = B_{(i+k)(j+k)} \to \dfrac{1}{g} \end{array}\right\} \Leftrightarrow \text{both } x_i \text{ and } x_{i+k} \text{ are chosen.} \qquad 3.)$$

Likewise, if $f_j \in g$, and $f_{j+k} \notin g$, then $\beta_{j+k} \in \mathcal{N}$ ($\beta_{j \in g}$) the nullspace of any vector that could select a feature in $\beta_g$.

Between Class Filter Optimization

Clustering for each class will naturally yield similar recurrent fillers among classes that, while representative of a portion of a single class, are not discriminative between them. For example, one will often find that a large portion of most images contain the sky. This is true whether or not one wishes to differentiate between images of, say, mountains or buildings, two completely unrelated concepts that happen to share a similar feature in the images. Analogously, the discriminating power in "sky features", which the within feature optimization will invariably produce, will be low because P(mountain|sky) and P(buildings|sky) values are small.

Deletion of similar filters is then a logical step, and the choices of which filters to remove are simply those with high correlation occurring across a pair of classes. The class sample covariance matrix of the reduced set of features from above, should, in theory, relate one-to-one if steps in equation (5) were conducted correctly, and threshold $t_{keep}$ is defined for features that are to be kept.

Let $X^{(r)} \subseteq X$ and $Y^{(r)} \subseteq Y$ be the collection of within-class representative features for classes $c_1$ and $c_2$, respectively, where $x_i \in X^{(r)}$, $y_j \in Y^{(r)}$. The final set of pair-wise between-class filters discriminating $c_1$ and $c_2$ is:

$$\{(f_{c1} \cdot f_{c2})\} = \left\{(x_i, y_i) : \left(\max_{y_j} x_i^T y_j\right) < t_{keep}\right\} \qquad (6)$$

Hierarchical Filters

Hierarchical methods are especially useful for groupings that may appear different in different situations. Filter hierarchies address scenarios where groupings reflect some semantic organization. Image patch-based clustering of objects taken at several angles, times of days, etc., may appear different for each instance. Furthermore, mixture hierarchies are useful for complexity reasons because of reliance on the covariance matrix, where memory can grow according to M N. Since the proposed algorithm aims to remove redundancy, we prune especially large data sets (M and N on the order of millions) to a few relevant features to take advantage of central limit behavior, a property enabling one to automatically segment images without explicitly specifying boundaries.

Hierarchical training operates over several data subsets (e.g., images), effectively partitioning the class data. Optimization is done over each subset, and then between each subset. Irrelevant features (noise) will occur infrequently while class features will arise; normalization will asymptotically integrate noise to zero in distribution. The procedure is, then, to first find $\beta$ in data subsets and between data subset. After this optimization, the rows of $\beta$ corresponding to the highest frequency features relate to class structure.

On Complexity and Implementation

Aside from the calculation of the covariance matrix, the optimization problem is wholly independent of feature dimensionality. Computational load on the linear programming problem (specifically polytope containment) is driven by the number of constraints proportional to the number of data points squared. Unfortunately, depending on the choice of descent algorithm, the worst case complexity can be exponential time (simplex method), though there are ways to achieve strongly polynomial time.

The nature of class representation doesn't mandate exact feature solutions (here it is simply an average over clusters after the feature selection process finishes, anyway), and some freedom is afforded to approximate the best solution without finishing the LP. A simple single pass through the covariance matrix approximates the final solution.

Algorithmically, initialize the $j^{th}$ column $\beta_j$ to first select the row of the maximum covariance matrix entry, i.e. max $x_i^T y_j$. Then, we iterate j from 1 to M (the entire covariance matrix), and flip the state of $\beta_j$ to optimize the objective in equation (5), leaving the previous j−1 columns unchanged. Analogously, the intuition is to choose the best starting point (the solution when $\lambda$=0), and then to test the corners of the hypercube systematically and only once, an O(MN) solution.

Results

Figure 2A:
FIG. 2A shows an image of a scene.
Figure 2B:
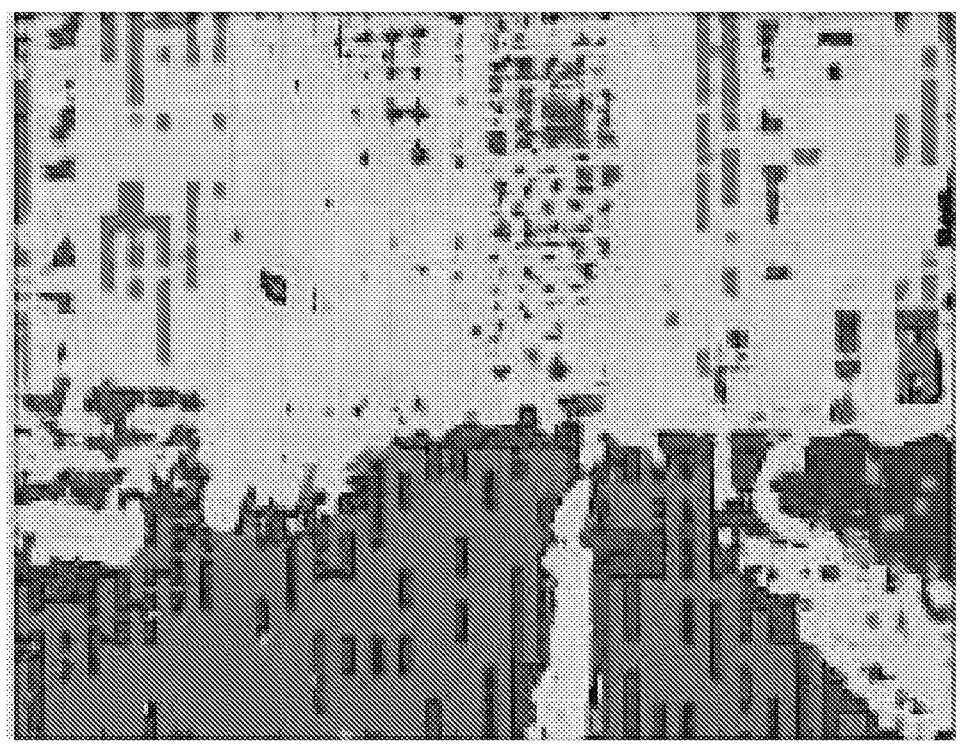
FIG. 2B shows a prototype identifying different portions of the image of FIG. 2A.
Figure 3A:
FIG. 3A shows an image of a crowd of people.
Figure 3B:
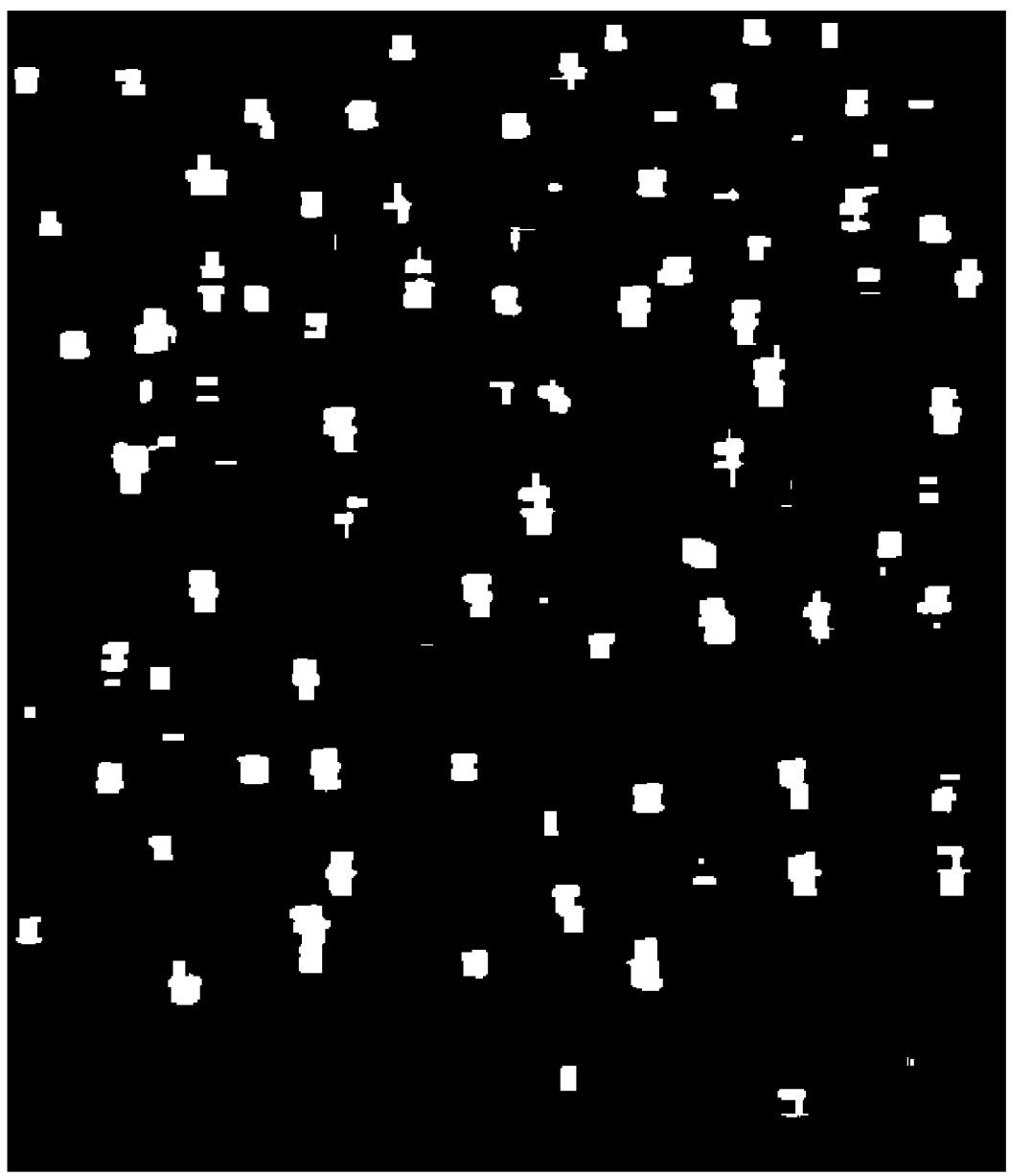
FIG. 3B shows a classification including faces for the image of FIG. 3A.
Figure 3C:
FIG. 3C shows the faces of FIG. 3B overlaid on the original image of FIG. 3A.

Unlike GMMs, linear sparse approximation avoids having to choose the number of clusters. The tradeoff is manifested in sensitivity to $\lambda$. The choice of $\lambda$ is based on expected clustering structure, inherent feature similarity, and the size of the data set. The advantages in clustering can be seen in FIGS. 2A and 2B. Training these algorithms take roughly a day, while GMMs will cluster on the order of weeks in parallelized MATLAB on a cluster of 64 cores.

To show proof of concept, training images of semantically labeled images were taken from the Corel data set. The feature set is taken from the top 8×8 block-based DCT coefficients over three color channels in zigzag scan order. Without segmentation, the results are shown in FIGS. 2A, 2B, 3A, 3B and 3C. The algorithm naturally performs well on texture, where features favor an ensemble statistical representation of what things look like on average over specific features (though this is feasible with large enough training sets.) Hence, applications pertaining to geo-localization are possible.

A sparse data representation procedure has been presented that can determine prototypes quickly and efficiently. This representation can be used for clustering. classification, and feature selection with the advantages of fast matched filtering. The algorithm has several contributions including: an approximation to the LP relaxation solves an optimization problem to obtain representative features; class prototypes based on their covariance matrix are sparse and can be tuned with a $\lambda$ parameter; filter hierarchies can be built and similar filters between classes can be removed; and results generalize well to several data sets.

Figure 4:
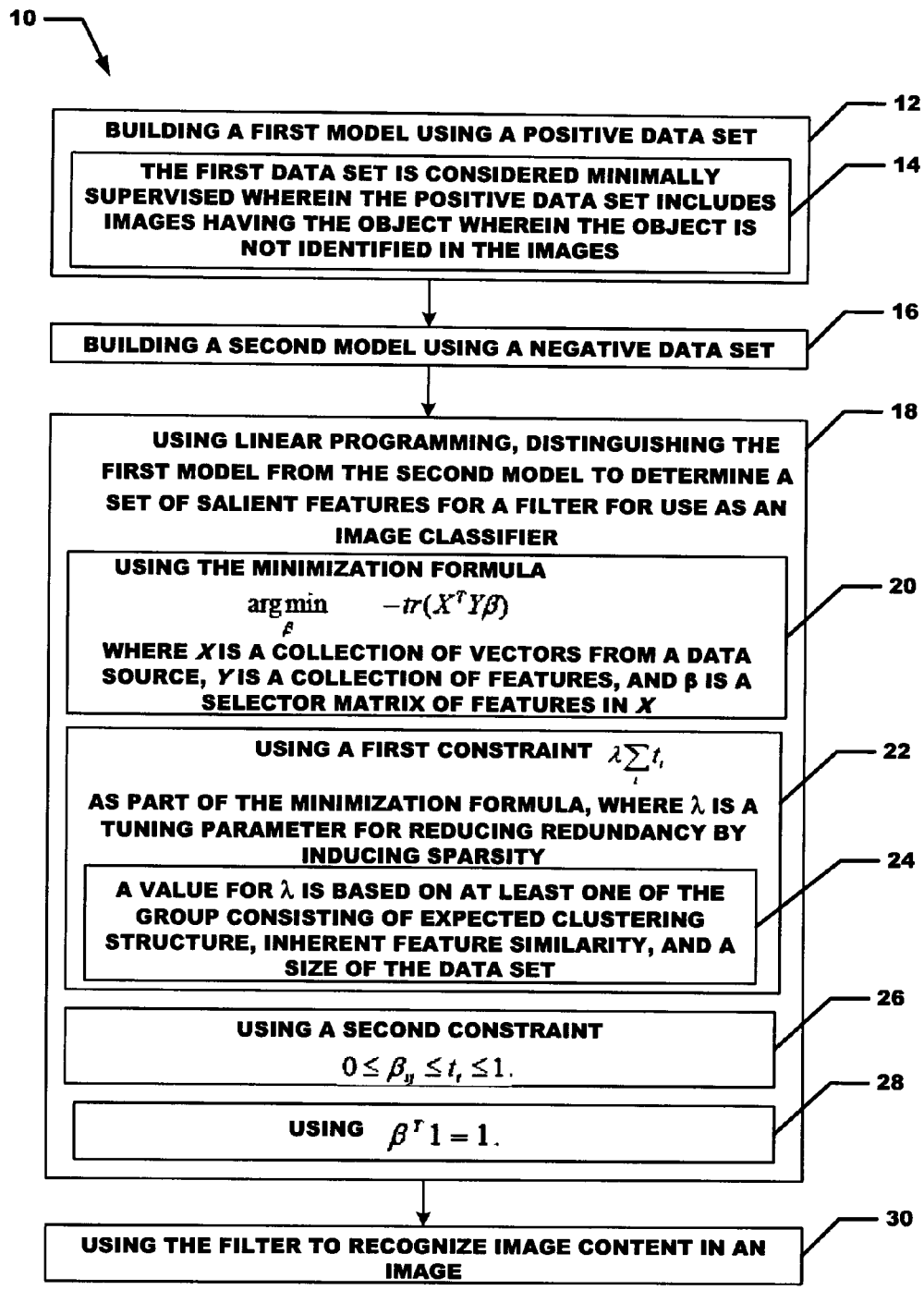
FIG. 4 depicts a flow diagram of a particular embodiment of a method for providing sparse class representation with linear programming in accordance with embodiment of the invention.

A flow chart of a particular embodiment of the presently disclosed method is depicted in FIG. 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring to FIG. 4, a particular embodiment of a method 10 for providing sparse class representation with linear programming is shown. Method 10 begins with processing block 12 which discloses building a first model using a positive data set. As shown in processing block 14 the positive data set is considered minimally supervised wherein the positive data set includes images having the object wherein the object is not identified in the images.

Processing block 16 states building a second model using a negative data set. The negative data set contains images that do not have the object in them.

Processing block 18 recites using linear programming, distinguishing the first model from the second model to determine a set of salient features for a filter for use as an image classifier. As shown in processing block 20, the using linear programming comprises using the minimization formula $$\operatorname*{argmin}_{\beta} -tr(X^T Y \beta)$$

where X is a collection of vectors from a data source, Y is a collection of features, and $\beta$ is a selector matrix of features in X. Processing block 22 recites using linear programming further comprises using a first constraint $$\lambda \sum_i t_i$$

as part of the minimization formula, where $\lambda$ is a tuning parameter for reducing redundancy by inducing sparsity. As shown in processing block 24 a value for $\lambda$ is based on at least one of the group consisting of expected clustering structure, inherent feature similarity, and a size of the data set. Processing block 26 discloses the using linear programming further comprises using a second constraint $0 \leq \beta_{ij} \leq t_i \leq 1$. As further shown in processing block 28 the using a second constraint further comprises using $$\beta^T 1 = 1.$$

Processing block 30 states using the filter to recognize image content in an image. Having developed a filter (or a class of filters) the filter(s) can be used to determine the presence of the object in a new set of images. While the present invention is described with respect to video images, it is not intended to be limited to only video images and is also applicable to data sets regarding audio signals, text, and the like.

Figure 5:
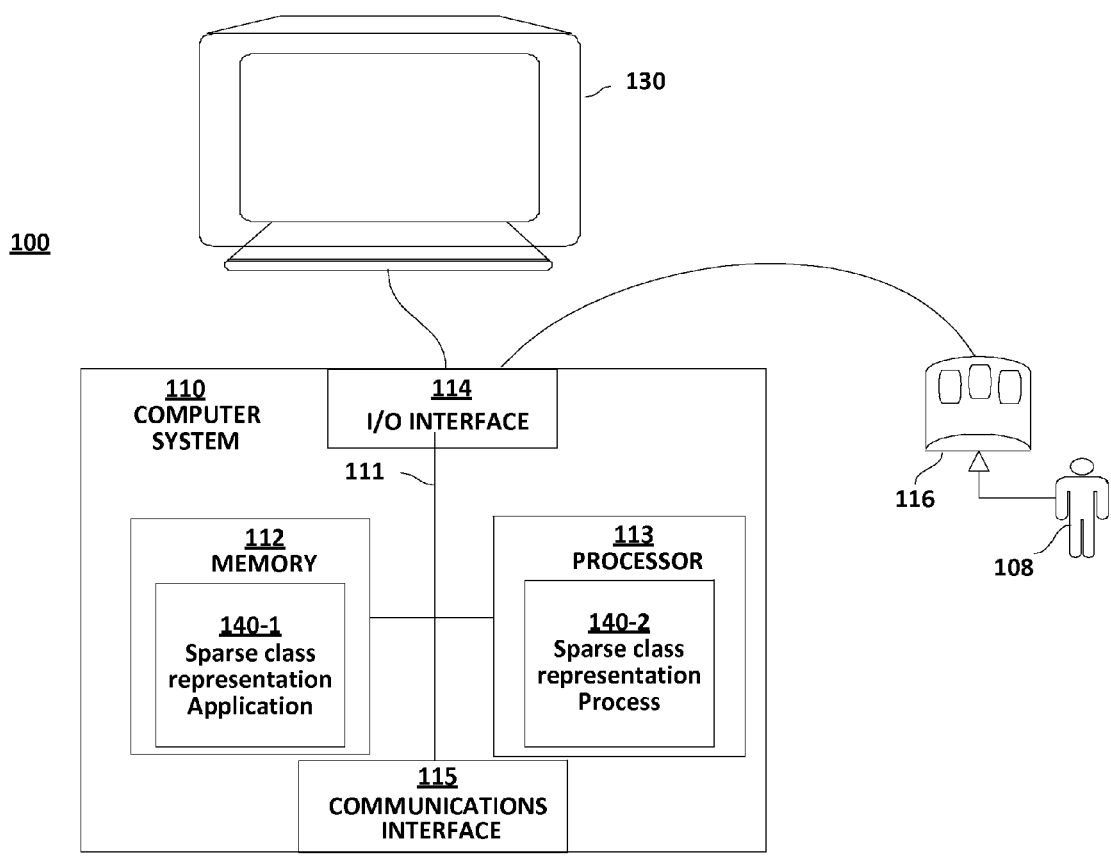
FIG. 5 illustrates an example computer system architecture for a computer system that provides providing sparse class representation with linear programming in accordance with embodiments of the invention.

FIG. 5 is a block diagram illustrating example architecture of a computer system 110 that executes, runs, interprets, operates or otherwise performs a sparse class representation operating application 140-1 and sparse class representation operating process 140-2 suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that the sparse class representation operating application 140-1 and process 140-2 provides on the display 130. Essentially, the graphical user interface 160 is where the customer 108-1 performs their 'online banking', specifying which bills are to be paid electronically, when those bills are to be paid, and the amount to be paid. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a sparse class representation operating application 140-1 as explained herein. The sparse class representation operating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a sparse class representation operating application 140-1. Execution of a sparse class representation operating application 140-1 in this manner produces processing functionality in the sparse class representation operating process 140-2. In other words, the sparse class representation operating process 140-2 represents one or more portions or runtime instances of a sparse class representation operating application 140-1 (or the entire a sparse class representation operating application 140-1) performing or executing within or upon the processor 113 in the computerized device 110 at runtime.

It is noted that example configurations disclosed herein include the sparse class representation operating application 140-1 itself (i.e., in the form of un-executed or non-performing logic instructions and/or data). The sparse class representation operating application 140-1 may be stored on a computer readable medium (such as a floppy disk), hard disk, electronic, magnetic, optical, or other computer readable medium. A sparse class representation operating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a sparse class representation operating application 140-1 in the processor 113 as the sparse class representation operating process 140-2. Those skilled in the art will understand that the computer system 110 may include other processes and/or software and hardware components, such as an operating system not shown in this example.

A display 130 need not be coupled directly to computer system 110. For example, the sparse class representation operating application 140-1 can be executed on a remotely accessible computerized device via the network interface 115. In this instance, the graphical customer interface 160 may be displayed locally to a customer 108 of the remote computer, and execution of the processing herein may be client-server based.

During operation, processor 113 of computer system 100 accesses memory system 112 via the interconnect 111 in order to launch, run, execute, interpret or otherwise perform the logic instructions of the sparse class representation application 140-1. Execution of sparse class representation application 140-1 produces processing functionality in sparse class representation process 140-2. In other words, the sparse class representation process 140-2 represents one or more portions of the sparse class representation application 140-1 (or the entire application) performing within or upon the processor 113 in the computer system 100.

It should be noted that, in addition to the sparse class representation process 140-2, embodiments herein include the sparse class representation application 140-1 itself (i.e., the un-executed or non-performing logic instructions and/or data). The sparse class representation application 140-1 can be stored on a computer readable medium such as a floppy disk, hard disk, or optical medium. The sparse class representation application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of sparse class representation application 140-1 in processor 113 as the sparse class representation process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
building a first model using a positive data set;
building a second model using a negative data set; and
using linear programming, distinguishing said first model from said second model to determine a set of features that make the object stand apart from rest of image data for a filter for use as an image classifier and wherein said using linear programming comprises using the minimization formula $$\operatorname*{argmin}_{\beta} -tr(X^T Y \beta)$$

where X is a collection of vectors from a data source, Y is a collection of features, and $\beta$ is a selector matrix of features in X using the determined features to classify an image.

2. The method of claim 1 wherein said using linear programming further comprises using a first constraint $$\lambda \sum_i t_i$$

as part of the minimization formula, where $\lambda$ is a tuning parameter for reducing redundancy by inducing sparsity.

3. The method of claim 2 wherein said using linear programming further comprises
using a second constraint $0 \leq \beta_{ij} \leq t_i \leq 1$.

4. The method of claim 3 wherein said using a second constraint further comprises
using $\beta^T 1 = 1$.

5. The method of claim 1 further comprising using said filter to recognize image content in an image.

6. The method of claim 2 wherein the choice of a value for $\lambda$ is based on at least one of the group consisting of expected clustering structure, inherent feature similarity, and a size of the data set.

7. The method of claim 1 wherein said positive data set is considered minimally supervised wherein said positive data set includes images having the object wherein the object is not identified in said images.

8. A non-transitory computer readable storage medium having computer readable code thereon for sparse class representation using linear programming, the medium including instructions in which a computer system performs operations comprising:
building a first model using a positive data set;
building a second model using a negative data set; and
using linear programming, distinguishing said first model from said second model to determine a set of features that make the object stand apart from rest of image data for a filter for use as an image classifier and wherein said using linear programming comprises using the minimization formula $$\operatorname*{argmin}_{\beta} -tr(X^T Y \beta)$$

where X is a collection of vectors from a data source, Y is a collection of features, and $\beta$ is a selector matrix of features in X using the determined features to classify an image.

9. The computer readable storage medium of claim 8 further comprising instructions wherein said using linear programming further comprises
using a first constraint $$\lambda \sum_i t_i$$

as part of the minimization formula, where $\lambda$ is a tuning parameter for reducing redundancy by inducing sparsity.

10. The computer readable storage medium of claim 9 further comprising instructions wherein said using linear programming further comprises using a second constraint $0 \leq \beta_{ij} \leq t_i \leq 1$.

11. The computer readable storage medium of claim 10 further comprising instructions wherein said using a second constraint further comprises using $\beta^T 1=1$.

12. The computer readable storage medium of claim 8 further comprising further comprising instructions for using said filter to recognize image content in an image.

13. The computer readable storage medium of claim 9 further comprising instructions wherein the choice of a value for $\lambda$ is based on at least one of the group consisting of expected clustering structure, inherent feature similarity, and a size of the data set.

14. The computer readable storage medium of claim 8 further comprising instructions wherein said positive data set is considered minimally supervised wherein said positive data set includes images having the object wherein the object is not identified in said images.

15. A computer system comprising:
a memory;
a processor;
a communications interface;
an interconnection mechanism coupling the memory, the processor and the communications interface; and
wherein the memory is encoded with an application providing sparse class representation using linear programming, that when performed on the processor, provides a process for processing information, the process causing the computer system to perform the operations of:
building a first model using a positive data set;
building a second model using a negative data set; and
using linear programming, distinguishing said first model from said second model to determine a set of features that make the object stand apart from rest of image data for a filter for use as an image classifier and wherein said using linear programming comprises using the minimization formula $$\underset{\beta}{\mathrm{argmin}}\ -tr(X^T Y \beta)$$

where X is a collection of vectors from a data source, Y is a collection of features, and $\beta$ is a selector matrix of features in X using the determined features to classify an image.

16. The computer system of claim 15 wherein said using linear programming further comprises using a first constraint $$\lambda \sum_i t_i$$

as part of the minimization formula, where $\lambda$ is a tuning parameter for reducing redundancy by inducing sparsity.

17. The computer system of claim 16 wherein said using linear programming further comprises using a second constraint $0 \leq \beta_{ij} \leq t_i \leq 1$ and $\beta^T 1=1$.

18. The method of claim 1 wherein said salient features comprises features that make an object stand out from a remainder of an image.

19. The computer readable medium of claim 8 wherein said salient features comprises features that make an object stand out from a remainder of an image.

20. The computer system of claim 15 wherein said salient features comprises features that make an object stand out from a remainder of an image.

* * * * *